United States Patent [19]

Brunelli et al.

[11] Patent Number: 4,612,172

[45] Date of Patent: Sep. 16, 1986

[54] PURIFICATION OF MOLYBDENUM

[75] Inventors: Timothy A. Brunelli; Michael J. Cheresnowsky, both of Towanda, Pa.

[73] Assignee: GTE Products Corporation, Stamford, Conn.

[21] Appl. No.: 704,685

[22] Filed: Feb. 22, 1985

[51] Int. Cl.$^4$ .............................................. C01G 39/00
[52] U.S. Cl. ...................................... 423/56; 423/593
[58] Field of Search ............................ 423/53, 56, 593

[56] References Cited

U.S. PATENT DOCUMENTS

| 3,694,147 | 9/1972 | Drobnick et al. | 423/53 |
| 3,860,419 | 1/1975 | Weber et al. | 423/53 |
| 3,957,946 | 5/1976 | Ronzio et al. | 423/56 |
| 4,525,331 | 6/1985 | Cheresnowsky et al. | 423/56 |

*Primary Examiner*—H. T. Carter
*Attorney, Agent, or Firm*—Donald R. Castle; L. Rita Quatrini

[57] ABSTRACT

A process is disclosed for removing potassium from a relatively impure molybdenum trioxide and forming a molybdenum compound of high purity. The process involves first contacting the impure molybdenum trioxide with an acid leach which consists essentially of a mineral acid and the ammonium salt of the mineral acid in a weight ratio of above about 3 to 1 of acid leach to molybdenum trioxide at a sufficient temperature and for a sufficient time to solubilize the major portion of the potassium and form a leached molybdenum trioxide, followed by separating the leached molybdenum trioxide from the resulting potassium containing acid leach. The leached molybdenum trioxide is then water washed to remove residual impurities and the washed molybdenum trioxide is dissolved in ammonium hydroxide having an ammonium concentration sufficient to form an ammonium molybdate solution from which is crystallized the highly pure molybdenum compound.

4 Claims, No Drawings

PURIFICATION OF MOLYBDENUM

FIELD OF THE INVENTION

This invention relates to a process for removing potassium from relatively impure molybdenum trioxide. More particularly, it relates to a process for removing potassium from relatively impure molybdenum trioxide by acid leaching the molybdenum trioxide.

BACKGROUND OF THE INVENTION

Molybdenum compounds of high purity are required for various applications such as in catalysts, etc.

Heretofore, there have been a number of processes for upgrading relatively impure molybdenum compounds as molybdenum trioxide.

U.S. Pat. No. 3,957,946 discloses a process for purifying molybdenum which involves subjecting impure concentrates of molybdenum trioxide to oxidative roasting, followed by ammoniacal leaching of the molybdic trioxide to produce ammonium molybdate which is further purified by passage through a chelating cation exchange resin.

U.S. Pat. Nos. 3,848,049 and 3,829,550 disclose purification processes for molybdenum which involve leaching of molybdenum trioxide with dilute nitric acid.

U.S. Pat. No. 3,694,147 discloses a process for purifying molybdenum trioxide of impurities such as lead, copper, iron, zinc and some alkaline earths by leaching with an aqueous solution of a hydrochloric acid and an ammonium salt of the halide.

U.S. Pat. No. 3,860,419 relates to the process for recovering molybdenum from molybdenum concentrates by digesting the concentrate in an aqueous nitric acid solution containing ammonium nitrate, separating the solid phase from the liquid phase, and treating the solid phase with ammonium hydroxide to produce ammonium molybdate. In column 3 lines 9 to 16, the digesting solution is disclosed as containing substantially 1.0 to 4.0 moles per liter of free nitric acid and 0.5 to 2.0 moles per liter of ammonium nitrate. The weight ratio of solution to concentrate is substantially 1 to 1 to 3 to 1. In column 3, lines 17 to 26, the preferred range of the solution is described as containing from about 2.0 to 2.3 moles per liter nitric acid and 1.5 to 2 moles per liter of ammonium nitrate.

In the above processes some impurities remain to contaminate the product.

Potassium is a particularly difficult impurity to remove. When U.S. Pat. No. 3,860,419 is followed for purifying molybdenum, the potassium is not sufficiently reduced for use as high purity material.

Therefore, a process for purifying molybdenum in which the potassium from level is further reduced from the values given above be highly desirable and an advancement in the art.

SUMMARY OF THE INVENTION

In accordance with one aspect of this invention, there is provided a process for removing potassium a relatively impure molybdenum oxide and forming a molybdenum compound of high purity. The process involves first contacting the impure molybdenum trioxide with an acid leach which consists essentially of a mineral acid and the ammonium salt of the mineral acid in a weight ratio of above about 3 to 1 of acid leach to molybdenum trioxide at a sufficient temperature and for a sufficient time to solubilize the major portion of the potassium and form a leached molybdenum trioxide, followed by separating the leached molybdenum trioxide from the resulting potassium containing acid leach. The leached molybdenum trioxide is then water washed to remove residual impurities and the washed molybdenum trioxide is dissolved in ammonium hydroxide having a sufficient ammonia concentration to form an ammonium molybdate solution from which is crystallized a highly pure molybdenum compound.

DETAILED DESCRIPTION OF THE INVENTION

For a better understanding of the present invention, together with other and further objects, advantages, and capabilities thereof, reference is made to the following disclosure and appended claims in connection with the above description of some of the aspects of the invention.

By the process of this invention, molybdenum trioxide is subjected to a purification process in which the potassium is effectively removed and thereafter a molybdenum compound of high purity is formed.

The starting material to be purified is molybdenum trioxide. Generally the potassium level is from about 700 to about 4000 parts per million and most typically from about 1000 to about 2000 parts per million. The relatively impure molybdenum trioxide is first contacted preferably with vigorous agitation with an acid leach which is made up essentially of a mineral acid and its ammonium salt, the purpose of which is to dissolve or leach out the major portion of the potassium into the acid leach.

Generally any mineral acid with its ammonium salt can be used, such as hydrochloric acid with ammonium chloride, sulfuric acid with ammonium sulfate, and nitric acid with ammonium nitrate, with the latter being the preferred acid leach of this invention.

In accordance with the preferred embodiment, the nitric acid concentration is preferably about 2.3 molar. The ammonium nitrate concentration is preferably from about 1.5 molar to about 2.0 molar with about 1.75 molar being especially preferred. Therefore the preferred acid leach concentration is about 2.3 molar nitric acid and about 1.75 molar ammonium nitrate.

The weight ratio of acid leach to impure molybdenum trioxide is critical to efficiently remove potassium from the molybdenum trioxide. U.S. Pat. No. 3,860,419 discloses a weight ratio of about 3 to 1 acid leach to molybdenum trioxide. However, by that method the potassium is not sufficiently reduced in the molybdenum trioxide to warrant its use in high purity applications.

By the process of this invention, above about 3 parts by weight of acid leach is contacted with 1 part by weight of impure molybdenum trioxide. In general, the higher this weight ratio, the greater the reduction of potassium in the molybdenum trioxide. However with the higher ratios, there is greater likelihood of loss of molybdenum to the acid leach. Therefore, it is preferred to use a weight ratio of from about 4.3 to 1 to about 4.8 to 1 of acid leach to impure molybdenum trioxide. At these ratios the potassium is reduced to levels which render the molybdenum suitable for use as high purity material and at the same time the loss of molybdenum to the acid leach is at a minimum.

The impure molybdenum trioxide is contacted with the acid leach preferably at elevated temperatures to facilitate the potassium removal. Temperatures are generally from about 50° C. to about 100° C. with from about 75° C. to about 85° C. being preferred. Heating times are generally from about 1 hour to about 3 hours.

The leached molybdenum trioxide is then separated from the potassium containing acid leach by any standard technique such as filtration or decantation.

The molybdenum trioxide is then washed with sufficient water to remove any residual impurities, in particular impurities resulting from contamination by the acid leach. The washing step is carried out preferably by contacting the leached molybdenum trioxide with water, preferably deionized water at about 2 parts of water per part of molybdenum oxide and stirring vigorously for from about 15 minutes to about 45 minutes. The resulting washed molybdenum trioxide is then separated from the resulting wash water by any standard technique such as filtration or decantation. If separation is by decantation, there is still a likelihood of some contamination by the acid leach and therefore, the once washed molybdenum trioxide is rewashed preferably at least once according to the above procedure. If separation is by filtration, no further washing is usually needed.

The washed molybdenum trioxide is then dissolved in ammonium hydroxide to form an ammonium molybdate solution. The ammonium hydroxide is made up of from about 9% to about 21% by weight of ammonia. The pH of the resulting solution is generally maintained at from about 9.0 to about 9.9 by further addition of ammonium hydroxide, preferably in concentrated form, as necessary. To insure essentially complete dissolution of the washed molybdenum trioxide and formation of the ammonium molybdate solution, the resulting ammonium hydroxide-molybdenum trioxide mixture is preferably stirred at elevated temperatures, most preferably at from about 50° C. to about 60° C.

Typically proportions of about 1 gram of washed molybdenum trioxide is dissolved in about 1.4 milliliters of concentrated ammonium hydroxide and about 2 milliliters of water. Or alternately, about 4500 pounds of washed molybdenum trioxide is dissolved in about 1800 to about 2000 gallons of ammonium hydroxide which contains about 21% by weight of ammonia.

The resulting ammonium molybdate solution contains typically from about 200 to about 350 grams of $MoO_3$ per liter. In general any concentration can be used. However, for economic feasibility, the above range is preferred.

The above described dissolution of the washed molybdenum trioxide in ammonium hydroxide is carried out to further purify the washed molybdenum trioxide.

The resulting ammonium molybdate solution is then peferably cooled and any solid impurities are separated from it by any standard technique, but most preferably by filtration.

A high purity molybdenum compound is then crystallized from the ammonium molybdate solution by standard methods. One such method is to evaporate the ammonium molybdate solution and take one or more crystal crops of molybdenum compound which in this case is generally ammonium paramolybdate or ammonium dimolybdate.

Alternately, the ammonium molybdate solution can be evaporated to dryness in which case the molybdenum compound is ammonium dimolybdate. The high purity molybdenum compound contains no greater than about 100 weight parts per million of potassium.

To more fully illustrate this invention, the following non-limiting examples are presented. All parts, portions, and percentages are on a weight basis unless otherwise stated.

EXAMPLE 1

About 200 parts of impure molybdenum trioxide containing about 1300 parts per million of potassium is contacted with an acid leach which consists essentially of 2.3 molar nitric acid and about 1.75 molar ammonium nitrate in various weight ratios of acid leach to molybdenum trioxide for about 2 hours at about 75° C. The resulting leached molybdenum trioxide is separated from the resulting acid leach by filtration, and washed twice with sufficient water to remove residual impurities. The resulting washed molybdenum trioxide is dissolved in about 11% ammonium hydroxide to form an ammonium molybdate solution which is evaporated to dryness to form ammonium dimolybdate. (ADM)

Below are given the weight ratios of acid leach to molybdenum trioxide and the potassium levels in the resulting ammonium dimolybdate, along with the percent Mo lost to the acid leach.

| # | Weight ratio acid leach: $MoO_3$ | ppm K in ADM | % Mo lost in leach |
|---|---|---|---|
| 1 | 1.2:1 | 100 | 0.5 |
| 2 | 2.4:1 | 73 | 1.0 |
| 3 | 3.6:1 | 58 | 1.5 |
| 4 | 4.8:1 | 52 | 1.8 |
| 5 | 7.2:1 | 49 | 2.4 |
| 6 | 9.6:1 | 43 | 5.7 |

It can be seen that as the weight ratio of acid leach to $MoO_3$ increases, the level of potassium in the ADM drops. In numbers 1 and 2 the ranges of the prior art shown here for comparison purposes, the potassium is higher than in the higher ratios. The % Mo loss increases with the weight ratio. In #4 which is the preferred ratio, the Mo loss is at a minimum while the level of K is significantly lower than in the lower weight ratios.

EXAMPLE 2

About 1 part of molybdenum trioxide having about 1400 parts per million of potassium is contacted with about 4.3 parts of acid leach having the composition of about 2.3 molar nitric acid and about 1.75 molar ammonium nitrate with vigorous stirring for about 2 hours at about 75° C. The resulting leached molybdenum trioxide and acid leach are then allowed to cool and settle. The acid leach is then decanted from the leached molybdenum oxide. Deionized water is added such that about 2.8 parts of water are present for 1 part of leached molybdenum trioxide. The molybdenum trioxide and water are stirred for about 30 minutes at room temperature, and the molybdenum trioxide is allowed to settle. The wash water is then decanted from the washed molybdenum trioxide. The wash as described above is repeated once more. About 1 part of concentrated ammonium hydroxide is added to the washed molybdenum trioxide with stirring for about 30 minutes after which concentrated ammonium hydroxide is added to raise the pH to about 9.9. The resulting mixture is stirred for about 2 hours at about 50 to about 60° C. and the pH is maintained at about 9.9 by addition of ammonium hydroxide. The resulting solution is cooled and filtered to separate impurities from the resulting ammonium molybdate solution. The crystal crop of ammonium dimolybdate which is subsequently recovered by evaporation of the solution contains about 50 parts per million of potassium.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for removing potassium from relatively impure molybdenum trioxide and forming a molybdenum compound of high purity, said process comprising:
   (a) contacting said impure molybdenum trioxide with an acid leach which consists essentially of a mineral acid and the ammonium salt of said mineral acid in a weight ratio of about 4.3 to 1 to about 4.8 to 1 of said acid leach to said impure molybdenum trioxide at a sufficient temperature and for a sufficient time to solubilize the major portion of the potassium and form a leached molybdenum trioxide;
   (b) separating said leached molybdenum trioxide from the resulting potassium containing acid leach;
   (c) washing said leached molybdenum trioxide with sufficient water to remove any residual impurities;
   (d) separating the resulting washed molybdenum trioxide from the resulting wash water;
   (e) dissolving the resulting washed molybdenum trioxide in ammonium hydroxide having a sufficient ammonia concentration to form an ammonium molybdate solution; and
   (f) crystallizing the highly pure molybdenum compound from said ammonium molybdate solution.

2. A process according to claim 1 wherein said mineral acid is nitric acid and said ammonium salt is ammonium nitrate.

3. A process according to claim 1 wherein said impure molybdenum trioxide is contacted with said acid leach at from about 50° C. to about 100° C. for from about 1 to about 3 hours.

4. A process according to claim 1 wherein the high purity molybdenum compound contains no greater than about 100 weight parts per million of potassium.

* * * * *